Jan. 28, 1958 C. E. LARRABEE 2,821,135

AUTOMATIC TIME RECORDER

Filed May 26, 1954 2 Sheets-Sheet 1

*INVENTOR.*
CLINTON E. LARRABEE

BY Geoffrey Knight
ATTORNEY

Jan. 28, 1958 C. E. LARRABEE 2,821,135

AUTOMATIC TIME RECORDER

Filed May 26, 1954 2 Sheets-Sheet 2

INVENTOR.
CLINTON E. LARRABEE

BY Geoffrey Knight
ATTORNEY

United States Patent Office 2,821,135

Patented Jan. 28, 1958

2,821,135

AUTOMATIC TIME RECORDER

Clinton E. Larrabee, Binghamton, N. Y., assignor to International Business Machines Corporation, New York, N. Y., a corporation of New York Application May 26, 1954, Serial No. 432,527

5 Claims. (Cl. 101—287)

This invention relates to time recorders, and more particularly, to recorders of the type in which a record sheet is inserted to receive an automatic time registration thereon. The invention is designed as an improvement over the structure shown and described in my copending application, Serial No. 256,660, filed November 16, 1951, now Patent 2,715,054, for an Automatic Time Recorder.

In the copending application above referred to, the recording operation is automatically initiated after the record is inserted without the necessity of having the record sheet move a contact blade or actuate a mechanical trip mechanism. The recorder is adapted to be used on record sheets of thinner structure than could be used if it were necessary for the sheet to physically move some member of a trip mechanism. The recorder is provided with means for preventing the operation of the recorder more than once without removing the record sheet entirely from the record receiver. This feature eliminates the possibility of overprinting.

However, in the above structure, it is necessary for the record sheet to actuate a multiple print prevention lever upon insertion into the record receiver. The resistive force that is attendant with this type of lever may cause a crumpling of a record sheet of particularly thin material upon attempted insertion into the record receiver.

The present invention is designed to overcome the above-noted limitation and contemplates the use of a record detector which is brought into an operative position by the print impression mechanism after initial operation to prevent multiple registrations.

The principal object of the invention is to provide a recorder with an improved means for positively and automatically breaking the impression circuit after a single actuation of the printing mechanism and for thereafter holding the impression circuit open until the record sheet is removed from the receiver.

Other objects of the invention will be pointed out in the following description and claims and illustrated in the accompanying drawings, which disclose, by way of example, the principle of the invention and the best mode, which has been contemplated, of applying that principle.

*Main drive*

Figures 1, 2:
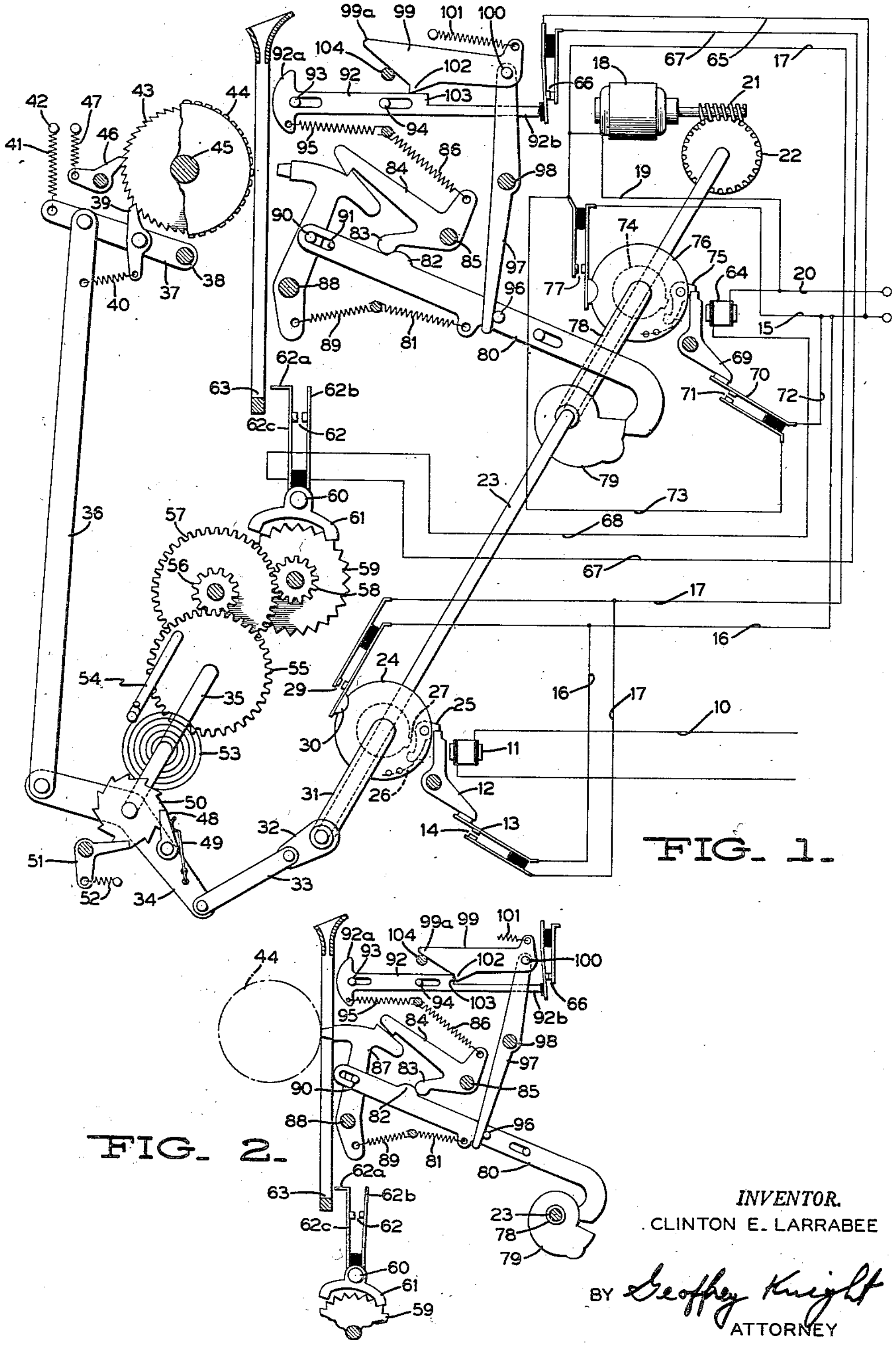
Fig. 1 is a schematic view revealing the structural arrangement of the various mechanisms of the recorder including the electrical wiring.
Fig. 2 is a schematic view of the printing mechanism showing the position of the elements as printing is being effected.

In the preferred embodiment shown in the drawings, minute impulses from a master clock or other timing device (not shown) are transmitted over a wire 10 to energize a magnet 11 (Fig. 1). The magnet 11 attracts a clutch lever 12 which is pivotally mounted so that it is normally held in a retracted position by tension of the upper blade 13 of a pair of normally open contacts 14. The attraction by magnet 11 causes the clutch lever 12 to pivot clockwise far enough to close the contacts 14 to initiate a motor running circuit which extends from one side of a suitable power source (not shown) connected to line 15, line 16, closed contacts 14, line 17, a motor 18, line 19 and line 20 back to the power source.

The shaft of motor 18 has a worm 21 attached which drives, in a clockwise direction, a worm gear 22 secured on the end of a main shaft 23. Adjacent the clutch lever 12 and loosely mounted on shaft 23 is a cam disc 24 which pivotally supports a clutch pawl 25. A spring blade 26 attached to cam disc 24 is adapted to urge the clutch pawl 25 in a clockwise direction so that it will latch up against one end of the clutch lever 12 when said lever is in the retracted or normal position. The attraction of clutch lever 12 by the energization of magnet 11 unlatches the clutch pawl 25 and the spring blade 26 urges the pawl to pivot in a clockwise direction far enough to allow a tail of the pawl to swing into the path of a projection 27 of a clutch disc 28 secured on the main shaft 23. The clutch disc 28 drives the pawl 25 and cam disc 24 in a clockwise direction for one revolution at the end of which time the clutch lever 12 will have returned to its retracted position allowing the pawl to latch up and stop the rotation of the cam disc 24.

A pair of normally open contacts 29 are arranged so that a projection 30 on the lower contact blade rests in a notch in the periphery of cam disc 24 when said disc is in a latched position. During the rotation of the cam disc the lower blade will ride up out of the notch and close the contacts 29 for the duration of the one revolution of the cam disc. The closure of contacts 29 serves to establish a hold circuit for the motor 18, paralleling the contacts 14, to keep the motor running for one complete revolution of the main shaft 23. This hold circuit extends from line 15, line 16, closed contacts 29, line 17, motor 18, line 19 to line 20.

*Typewheel setting mechanism*

Connected to the cam disc 24 by means of a bushing 31 is a lever 32 which makes one revolution along with the cam disc. A link 33 is connected between the lever 32 and a lever arm 34 pivotally mounted on a shaft 35 and as said lever 32 is caused to revolve, it causes the lever arm 34 to oscillate about shaft 35.

The other end of the lever arm 34 is connected to a link 36 which extends upward and fastens onto a lever 37 pivotally mounted on a stud 38. Attached to the lever 37 is a feed pawl 39 which is urged by means of a spring 40, extending between the pawl and the link 36, and a spring 41, extending between the end of lever 37 and a stud 42, to seat in the teeth of a ratchet wheel 43. The ratchet wheel is integral with a typewheel 44 pivotally mounted on a short shaft 45. It can be seen that one complete revolution of lever 32 in a clockwise direction will cause the link 36 to move first downward and then upward allowing the pawl 39 to seat in the next tooth to the right and drive the ratchet wheel and typewheel one space in a clockwise direction. A pawl 46 is urged by a spring 47 to seat in the teeth on the ratchet wheel and serves as a detent for the typewheel 44.

*Printing mechanism*

Pivotally attached to the lever arm 34 is a feed pawl 48 which is urged by a spring blade 49 to seat in the teeth of a ratchet wheel 50 secured on the shaft 35. Each time that lever 32 makes one revolution clockwise, the feed pawl 48 will advance the ratchet wheel one tooth space in a counterclockwise direction. A pawl 51 which is urged by a spring 52 to seat in the teeth of the ratchet wheel serves as a detent for the wheel and shaft 35.

Secured to the same shaft 35 with ratchet wheel 50 is a clock spring 53. As the ratchet wheel 50 is advanced, tension is stored in the spring 53 and through a connecting member 54 this power is transmitted to a gear 55 which is loosely mounted on the shaft 35.

The gear 55 then is caused to rotate in a counterclockwise direction and meshes with a pinion 56 fastened to a gear 57. The gear 57 meshes with a pinion 58 which is fastened to a ratchet wheel 59 causing said ratchet wheel 59 to rotate in a counterclockwise direction. Pivoted above ratchet wheel 59 on a stud 60 is an oscillating verge or escapement 61 to which is attached a pair of normally open contact springs 62.

It will be seen that as ratchet 59 rotates, it causes the verge 61 to rock back and forth imparting an arcuate back and forth or vibratory movement to the contact group 62. The energy stored in the clock spring 53 as a result of a receipt of a minutes impulse by magnet 11 is sufficient to keep the verge 61 vibrating until the next minutes impulse is received.

An extended end 62*a* of the left contact carrying arm 62*c* is adapted when rocked to enter the space at the lower end of a record sheet or card receiver 63. Should the card receiver be empty when the contact group is rocked to the left by the verge, the end 62*a* will merely enter the receiver and the other contact carrying spring 62*b* will move to the left but not a sufficient amount to catch up with the spring 62*c* to close the contacts. However, when a card has been placed in the receiver 63, the movement of end 62*a* toward the left is blocked by the card a sufficient amount so that when the contact carrying arm 62*b* is rocked to the left, it will catch up with contact carrying spring 62*c* and close the contacts 62.

Closure of the contacts 62 causes the energization of a magnet 64 by completing a circuit from line 15, line 65, closed contacts 66, line 67, closed contacts 62, line 68, magnet 64 to line 20. The magnet 64 attracts a clutch lever 69 which is pivotally mounted so that it is normally held in a retracted position by tension of the upper blade 70 of a pair of normally open contacts 71. The attraction by magnet 64 causes the clutch lever 69 to pivot clockwise far enough to close the contacts 71 to initiate a motor running circuit which extends from line 15, line 72, closed contacts 71, line 73, motor 18, line 19 to line 20. The motor 18 then, through worm 21 and worm gear 22, rotates the main shaft 23 in a clockwise direction.

Positioned on the shaft 23 adjacent to the clutch lever 69 is a second clutch arrangement which is identical in construction and operation to the one previously described in connection with the main drive. Clutch disc 74, secured on shaft 23, picks up pawl 75 and drives a cam disc 76 in a clockwise direction. As the cam disc 76 rotates it closes a pair of normally open contacts 77 to initiate a holding circuit, in parallel with the contacts 71, for keeping the motor in operation for one complete revolution of the cam disc 76. This holding circuit extends from line 15, through closed contacts 77, motor 18, line 19 to line 20. At the end of one revolution of cam disc 76, pawl 75 comes into engagement with the upper end of clutch lever 69 unlatching the pawl from clutch disc 74. Contacts 77 also open at this point to stop the motor.

Connected to the cam disc 76 by means of a bushing 78 is a printing cam 79. As print cam 79 moves in a clockwise direction, it releases a link 80 allowing it to be moved to the left to low dwell of the cam 79 by a spring 81 with such a movement projection 82 on the link comes into contact with end 83 of a latch lever 84 pivotally mounted on a stud 85. The latch lever is normally urged in a counterclockwise direction about stud 85 by a spring 86 and in the normal position is adapted to catch a shoulder on a printing hammer 87, pivoted on a stud 88, to hold said hammer in a retracted position. However, when projection 82 contacts end 83, the latch lever is raised releasing the printing hammer 87. The hammer is propelled by a spring 89 against the card causing it to be pressed against the typewheel 44 and ink ribbon (not shown) thereby printing the time of registration on the card.

As the printing cam 79 moves in a clockwise direction for one complete revolution, it will cause link 80 to be pulled back to the right. A stud 90 on the printing hammer extends into an elongated slot 91 on link 77 and as a result the link pulls the printing hammer back with it restoring tension in spring 89 and latching the hammer up with the latch lever 84.

A significant feature of the present invention is to provide means for making it impossible to operate the recorder more than once without removing the record entirely from the card receiver thus removing the possibility of overprinting. A unique interlock means to accomplish this is provided in the form of a horizontal bar or record detecting device 92 having a record engaging end 92*a* and a contact engaging end 92*b* which is slideably mounted on a pair of studs or guides 93 and 94 disposed in a pair of elongated slots. A bar returning spring 95 normally urges the record detecting device or bar 92 to the right against the studs 93 and 94 with the contact end 92*b* engaging the contacts 66 to maintain them closed, as shown in Fig. 1.

Referring to Fig. 2, when the link 80 is released by the cam 79 to initiate the printing operation and as the printing hammer 87 is released a pin 96 attached to the link 80 moves to the left and engages the lower end of a lever or member 97 and rocks or moves the same in a clockwise direction about a pivot stud 98. Disposed above and adjacent the record detecting device 92 is a latch lever 99 pivotally attached to the upper end of the lever 97 by means of a stud 100. The latch lever 99 is biased to the left and in a counterclockwise direction about the movable stud 100 by means of a lever spring 101. This normally biases a latch or projecting portion 102 in the direction of the record detecting device 92. The lever 99 is further provided with a forwardly directed camming surface 99*a* which is contoured to engage a stationary pin 104 during a portion of the operating cycle. As the cam operated link 80 moves to the left, the latch lever 99 will be pulled or moved to the right and biased downward so that the projection 102 will snap downward and engage an abutment or stepped surface 103 on the bar 92, as shown in Fig. 2.

Figure 3:
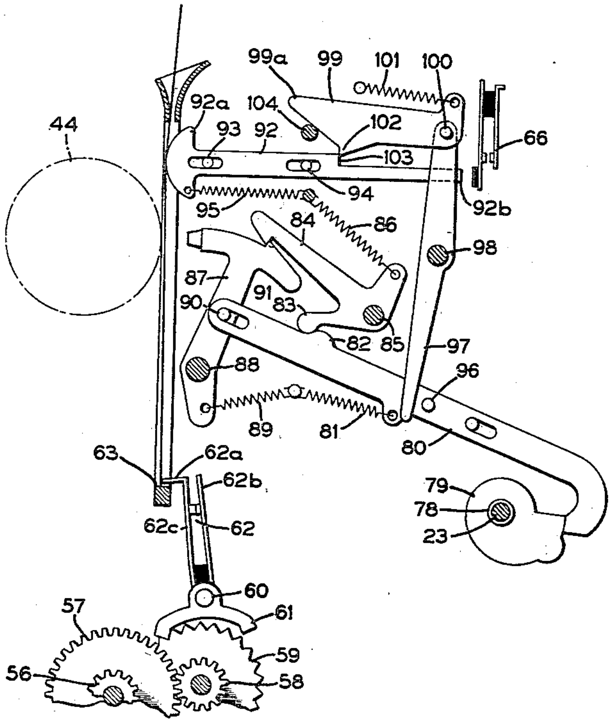
Fig. 3 is a schematic view of the printing mechanism showing the record detector member in engagement with the record after printing has been effected.

As the printing hammer is automatically returned to its normal position by rotation of the restoring cam 79, the movement of the pin 96 on the link 80 to the right will permit the latch lever 99 and the bar 92 latched thereto to be moved to the left by means of the lever spring 101. Since the tension in the lever spring 101 is sufficient to overcome the pressure exerted by the bar restoring spring 95, bar movement continues to the left until the end 92*a* engages the record located in the record receiver 63, as shown by Fig. 3, at which point further movement in this direction is terminated even though the printing hammer is restored and ready to be triggered. As the bar 92 is moved to the left, the end 92*b* permits the contacts 66 to open and they will remain open even after the printing hammer 95 has returned to its normal latched position and until such time as the record is removed from the receiver 63. In this arrangement as long as the contacts 66 are open the printing mechanism is rendered inoperative because these contacts are connected in series with the now periodically closed contacts 62, both of which must be closed to effect successive printing cycles.

As the record is removed from the receiver 63, the bar 92 is automatically propelled further to the left by the lever spring 101 and the end 92a enters the receiver. During such movement the camming surface 99a on the latch lever 99 will engage the stationary pin 104 and cam or rotate the lever 99 upwardly thereby releasing the bar 92 at the abutment 103. When released, bar 92 will be moved to the right by the bar spring 95, against the stops 93 and 94 and close the contacts 66. With the contacts 66 now in closed position, and with the print mechanism relatched, the recorder is ready for another printing operation upon the insertion of the next record.

From the foregoing it can be seen there has been provided an improved control means for insuring that the print hammer in a recorder is operated but once for each insertion of a record card or the like, in addition that no obstruction to the insertion of the record is provided to thereby permit the use of relatively thin record sheets.

While there has been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A machine for printing on an inserted record, comprising a receiver having a slot for receiving a record to be printed, a printing mechanism associated with said receiver to perform a printing operation, drive means for said printing mechanism including a control circuit therefor, a normally open first switch and a normally closed second switch connected in series in said circuit for controlling the operation of said drive means, said first switch being closed upon the insertion of a record in said receiver to energize said drive means and initiate a printing operation on the record, a record detecting device disposed adjacent the slot in said record receiver and having a slot entering portion and a contact engaging portion, spring means for normally holding said detecting device out of said slot and said second switch closed, a shiftable lever associated with said detecting device, an actuating member operative upon initiation of the printing operation to shift said lever into engagement with said detecting device, lever spring means for said lever operative upon engagement with said detecting device for moving the same into said slot to engage the record card being printed and for opening said circuit at said second switch to maintain said drive means inactive independently of the closure of said first switch, and an abutment engaged by said lever after the record has been removed from said receiver and the detecting device has been further moved through said slot by said lever spring for disengaging said detecting device and lever, said first-mentioned spring being effective after disengagement for returning said detecting device to its normal position out of said slot and with said second switch closed.

2. A machine for printing on an inserted record comprising a receiver having a slot therein for receiving the record to be printed, a printing mechanism having a portion disposed adjacent the slot for printing on the inserted record, normally idle drive means including a cyclically operable trip member for operating said printing mechanism, a record detecting device having a normal retracted position adjacent the slot in said receiver, a contact device normally held closed by said record detector when the same is in its normal position, a movable normally open contact assembly positioned adjacent said receiver, spring drive means for periodically moving a portion of said contact assembly into and out of the slot in said receiver to detect the presence of a record, means for connecting said contacts in series to control said drive means, said movable contact assembly being operative after the insertion of a record in the slot and upon engagement by the contact assembly to close the contact and operate said drive means, said drive means being operative to trip said print mechanism to perform the printing operation, means operated by said printing mechanism for shifting said record detector forward into engagement with the record in the slot and to open said closed contact, said last named contact being operative to open the control circuit to said drive means to prevent repetitive actuation of said printing mechanism, and means for returning said record detector to its normal position upon removal of the record from the slot in said receiver.

3. The combination as claimed in claim 2 including means for releasing the forward thrust on said record detector after removal of the record, said means for returning said record detector to its normal position adjacent the slot includes spring means which is effective to close the associated contact to condition the drive means for the next printing cycle.

4. A machine for printing on an inserted record, comprising a receiver having a slot for receiving a record to be printed, a printing mechanism associated with said receiver and having a portion disposed adjacent the slot to perform a printing operation on the record therein, drive means including operating means for said printing mechanism, a normally open first switch and a normally closed second switch connected in series for controlling the operation of said drive means, said first switch having a portion movable into engagement with the record after insertion in the slot to close the contact and operate said drive means to initiate the printing operation on the record, a record detecting device disposed adjacent the slot, spring means for holding said detecting device out of said slot and said second switch closed, a shiftable connection between said printing mechanism operating means and said detecting device, means under control of said operating means during a printing operation for actuating said shiftable connection to move said detecting device into engagement with the record in the slot and to open said second switch to prevent repeated operation of said drive means, and means for disconnecting said shiftable connection and said detecting device upon removal of the record from the slot, said spring means returning said record detecting device to its normal position and to close said second switch preparatory to the next printing operation.

5. A machine for printing on an inserted record, comprising a receiver having a slot for receiving a record to be printed, a printing mechanism associated with said receiver and having a portion disposed adjacent the slot to perform a printing operation on the record therein, drive means including trip means for said printing mechanism including a control circuit therefor, a normally open first switch and a normally closed second switch connected in series in said circuit for controlling the operation of said drive means, said first switch having a portion movable into engagement with the record after insertion in the slot to close the contact and operate said drive means to initiate a printing operation on the record, a record detecting device disposed adjacent the slot in said receiver, spring means for holding said detecting device out of said slot and said second switch closed, a latch member normally held out of engagement with said detecting device, a connection between said printing mechanism trip means and said latch member, means under control of said trip means for actuating said connection to latch said latch member with said detecting device to move the same into engagement with the record in the slot and open said second switch in the control circuit whereby repetitive printing operations are prevented, and means for unlatching said latch member and detecting device after a record has been removed from said receiver, said spring means returning said detecting device to its normal position out of the slot and to close said second contact whereby the circuit is conditioned for the next printing operation.

References Cited in the file of this patent

UNITED STATES PATENTS

| | | |
|---|---|---|
| 1,979,208 | Friden | Oct. 30, 1934 |
| 2,019,897 | Fiehl | Nov. 5, 1935 |
| 2,111,124 | Naylor | Mar. 15, 1938 |
| 2,127,897 | Watkins | Aug. 23, 1938 |
| 2,229,696 | Engst | Jan. 28, 1941 |
| 2,395,781 | Findlay | Feb. 26, 1946 |
| 2,454,025 | Amend | Nov. 16, 1948 |
| 2,600,822 | Yarnall | June 17, 1952 |